United States Patent [19]

Reber

[11] Patent Number: 4,685,281

[45] Date of Patent: Aug. 11, 1987

[54] HAY SPREADER

[75] Inventor: Walter Reber, Saverne, France

[73] Assignee: Kuhn, S.A., Cedex, France

[21] Appl. No.: 756,182

[22] Filed: Jul. 18, 1985

[30] Foreign Application Priority Data

Jul. 19, 1984 [FR] France .................. 84 11625

[51] Int. Cl.⁴ ............................................ A01D 78/12
[52] U.S. Cl. ........................................ 56/370; 56/377
[58] Field of Search .................................. 56/370, 377

[56] References Cited

U.S. PATENT DOCUMENTS

| 3,803,821 | 4/1974 | Peacock | 56/192 |
| 4,203,277 | 5/1980 | Kaetzel | 56/370 X |
| 4,397,135 | 8/1983 | Wattron | 56/370 X |
| 4,519,194 | 5/1985 | Aron et al. | 56/370 |
| 4,610,130 | 9/1986 | Mueller | 56/370 |

FOREIGN PATENT DOCUMENTS

| 5693 | of 1908 | United Kingdom . | |
| 2066034 | 7/1981 | United Kingdom | 56/370 |

Primary Examiner—Dalton L. Truluck
Attorney, Agent, or Firm—Oblon, Fisher, Spivak, McClelland & Maier

[57] ABSTRACT

A hay spreader having at least one drum (1, 2, 3) provided with a tapered flange (17) with flexible segments (18) intended for movement of products such as hay that are on the ground. The ends of the flexible segments (18) which are connected to the tapered flange (17) of each drum (1, 2, 3) are at least partly covered by panels (21). This invention makes it possible to improve the fastening of the flexible segments (18) to the drums (1, 2, 3).

24 Claims, 7 Drawing Figures

HAY SPREADER

FIELD OF THE INVENTION

This invention relates to machines comprising a frame carrying at least one drum provided on its lower part with a tapered flange to which are fastened flexible segments intended for movement of products that are on the ground.

BACKGROUND OF THE INVENTION

Machines of this type can be used in the agricultural sector for tossing hay, windrowing hay, or gathering hay cut and spread over the ground. However, the flexible segments on these machines quickly detach from the flange during working. In addition, hay is often caught at the level of fastening of the flexible segments to the flange, which alters the grabbing and movement of the hay.

OBJECT OF THE INVENTION

This invention has the aim particularly of improving the durability and functioning of machines equipped with flexible segments intended to move products that are on the ground.

SUMMARY OF THE INVENTION

For this purpose, an important characteristic of the invention consists in the fact that the ends of the flexible segments which are connected to the flange of the drum are at least partially covered by panels. Thanks to this covering, these flexible segments are maintained between two supports located on both sides of the flexible segments. This considerably improves fastening of the flexible segments to their associated flange and practically eliminates the risk of penetration and wedging of hay between the flange and the flexible segments.

According to another characteristic of the invention, the panels extend to the flange or to the wall of the corresponding drum. Further, the various panels applied to the same drum overlap at least partially. The panels thus exhibit a minimum of stops on which hay could catch.

For the same purpose, the panels of each drum can consist of a tapered crown.

According to another characteristic of the invention, the panels are provided with driving ribs or blades. Thus, they effectively participate in the movement of the hay. The ribs or blades advantageously extend in the direction of the driving ribs provided on the flexible segments to obtain a good cooperation with the flexible segments.

To promote disengagement of the hay from the panels and the flexible segments in the delivery zone, the ribs or blade of the panels and the ribs of the flexible segments slightly overlap. The ribs or blades of the panels are located—viewed in the direction of rotation of the corresponding drum—in front of the ribs of the flexible segments. Further, in the region where they overlap, the ribs or blades of the panels have approximately the same height as the ribs of the flexible segments. The hay thus passes from the ribs or blades of the covering panels to the ribs of the flexible segments without encountering obstacles. This partial covering also improves the connection between the flexible segments and the drum flange.

For these same reasons, the ribs provided on the flexible segments can partially penetrate into the driving ribs of the panels.

According to another characteristic of the invention, each flexible segment comprises at least one arc-shaped rib concentric with the drum, and the panels comprise at least one groove approximately of the same shape. Each arc-shaped rib on a drum fits into a corrresponding arc-shaped groove on the panels. Thus, a good holding of the flexible segments over the entire length of the arc-shaped rib is obtained. For this reason, it is advantageous to provide such a rib over the entire width of the flexible segments.

To improve the connection of the flexible segments with the flange and the panels of each drum, the flexible segments can also be provided with at least one groove into which a molding provided on the panels engages.

According to another characteristic of the invention, each flexible segment is bent downwardly. The outside part of each flexible segment forms an angle $\alpha$ of about 160° with the part of each flexible segment used for fastening the drum flange. During working, the outside parts of the segments are straightened under the effects of centrifugal force. They then extend in an extension of their inside parts and occupy an ideal position for grabbing the hay at ground level.

According to another characteristic of the invention, the outside parts of the segments are formed by strips. These strips are very flexible, which enables them to follow all the ups and downs of the ground well.

Another characteristic of the invention consists in providing a reinforcement under the flange of each drum. This reinforcement can consist of a ring the lower edge of which is closer to the ground than the outside edge of the flange. In this position, the ring protects the flange and the means for fastening the flexible segments to the flange.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PRESENTLY PREFERRED EMBODIMENTS

Figure 1:
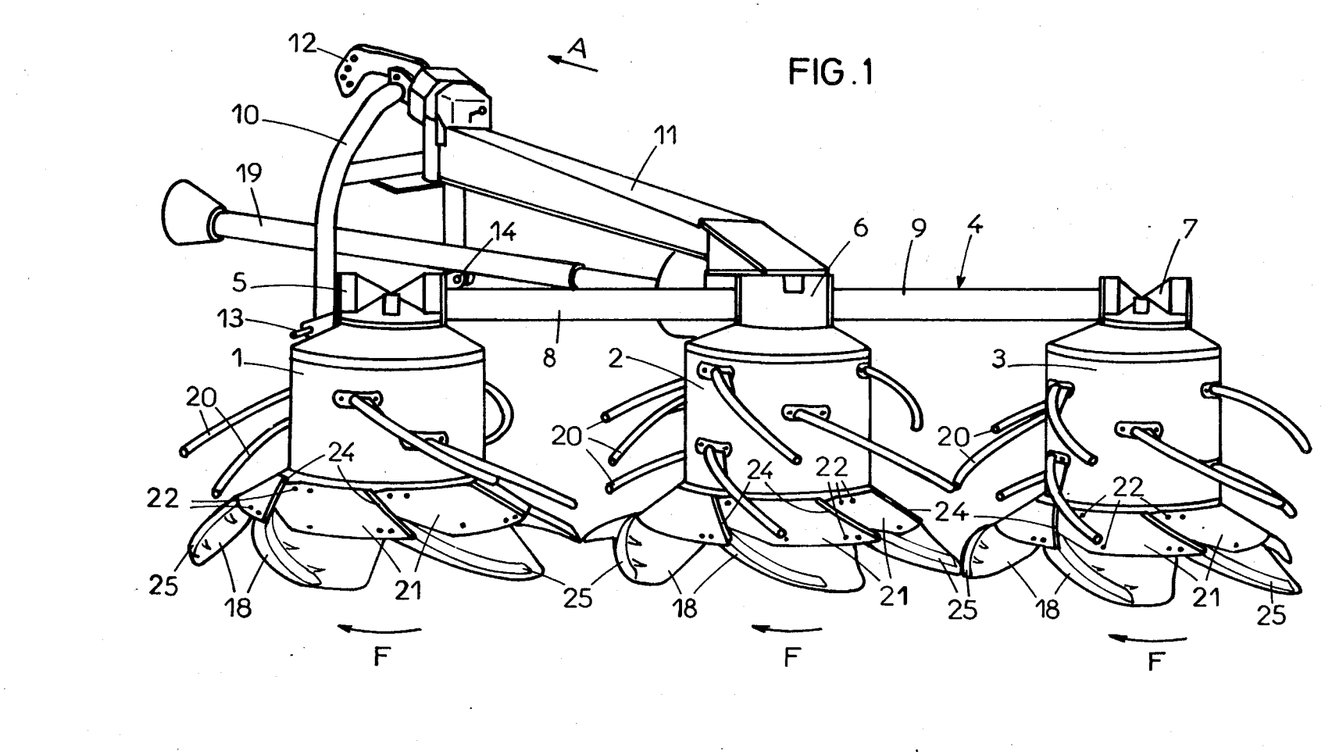
FIG. 1 shows an overall view of a machine according to the invention.

As shown in FIG. 1, the machine according to the invention comprises three approximately identical drums 1, 2, and 3. The drums 1, 2, and 3 are connected together by a crosswise frame 4. The crosswise frame 4 is made up of three housings 5, 6, and 7 each of which is on top of a corresponding one of the drums 1, 2, and 3 and of two tubes 8 and 9. The crosswise frame 4 is further connected to a frame 10 by a connecting beam 11. The frame 10 comprises three connecting points 12, 13, and 14 for hitching the machine to a driving tractor (not shown).

Figure 4:
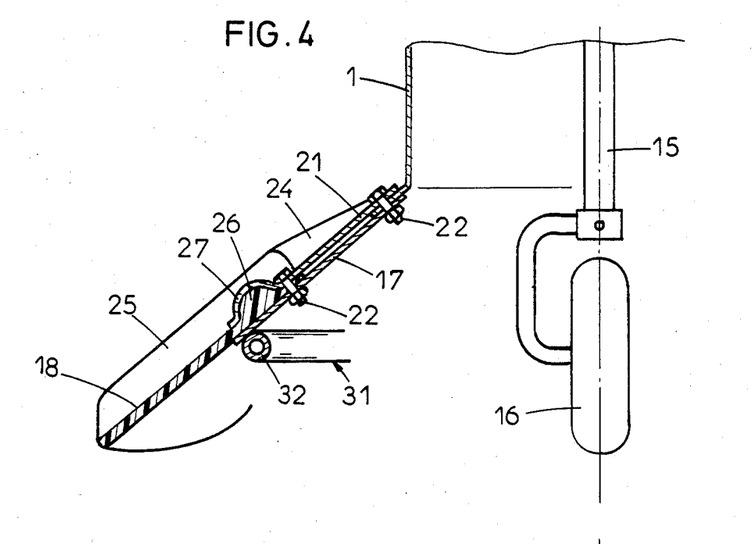
FIG. 4 shows a third embodiment of a drum according to the invention in section.
Figure 5:
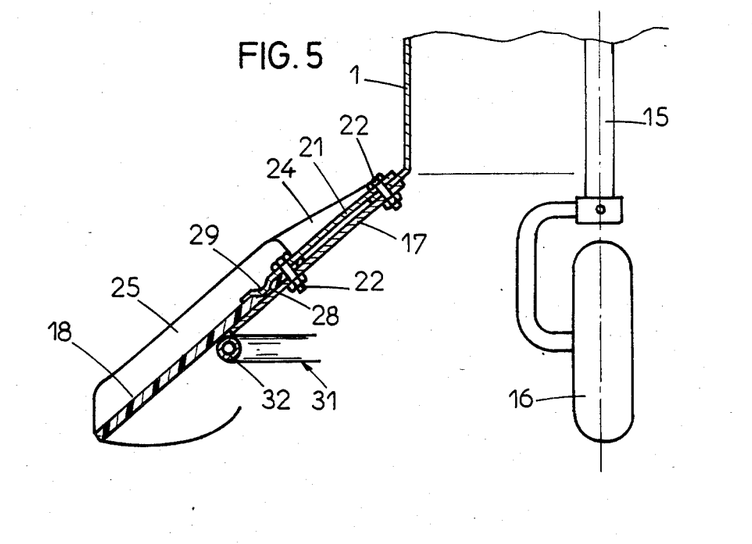
FIG. 5 shows a section similar to that of FIG. 4 of a fourth embodiment of a drum according to the invention.
Figure 6:
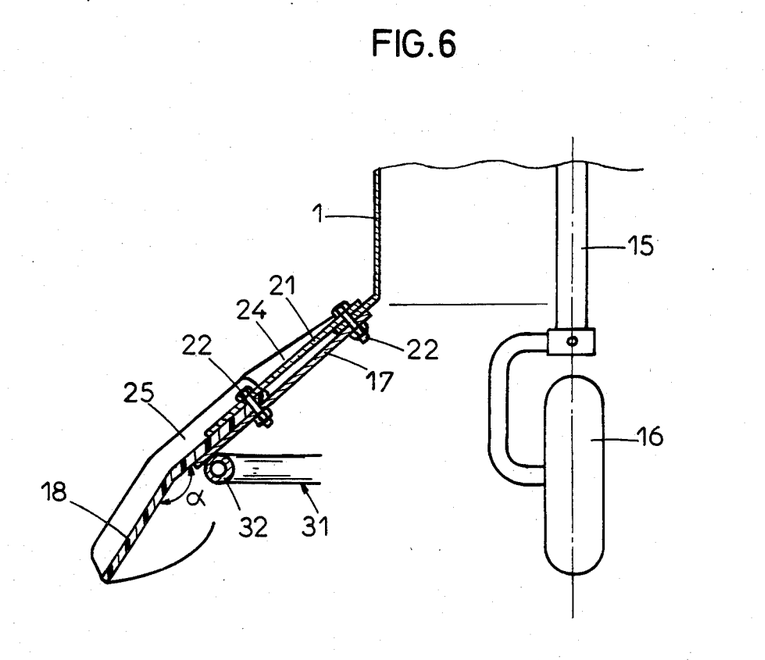
FIG. 6 shows a section similar to that of FIG. of a fifth embodiment of a drum according to the invention.

Drums 1, 2, and 3 have walls that are preferably rigid and are preferably made of sheet metal or plastic. Each of the drums 1, 2, and 3 is guided in rotation on a central support shaft 15 which is shown in FIGS. 4-6. The upper ends of the central support shafts 15 are connected to the associated one of the housings 5, 6, and 7 of the crosswise frame 4, while the lower ends of the central support shafts 15 carry a small wheel or roller 16 enabling the machine to move over the ground during work.

Each of the drums 1, 2, and 3 carries a tapered flange 17 (shown in FIGS. 4-6) on its lower part. The tapered flanges 17 are attached to the lower edges of the drums 1, 2, and 3, which are slightly flared for this purpose. To the tapered flanges 17 are fastened flexible segments 18 intended to gather products such as hay that are on the ground.

The machine shown in FIG. 1 is intended for windrowing or for moving hay already windrowed. The crosswise frame 4 is placed obliquely in relation to the direction of advance, which is indicated by an arrow A. The drums 1, 2, and 3 are driven in rotation in the direction of arrows F around their central support shafts 15 from the power take-off of the tractor. For this purpose, the power take-off is connected by a Cardan shaft 19 to an intermediate shaft (not shown). One end of the intermediate shaft extends into the housing 6 which is on top of the drum 2. In the housing 6, the intermediate shaft is provided with a bevel gear (not shown) which engages a ring gear (not shown) attached to the drum 2 and thus assures driving of the drum 2.

Driving of the drums 1 and 3 is also assured from the ring gear in the housing 6. For this purpose, a longitudinal shaft (not shown) is provided which is housed in the tubes 8 and 9 of the crosswise frame 4. The longitudinal shaft carries on its median part a gear (not shown) which engages the ring gear (not shown) in the housing 6 and, close to each of its ends, a bevel gear (not shown) that engages a ring gear (not shown) attached to the corresponding drum 1 or 3. The latter bevel gears and ring gears are housed in the housings 5 and 7 of the crosswise frame 4. During windrowing or movement of windrows, the flexible segments 18 slide under the hay, following the ups and downs of the ground. The hay is then lifted and moved laterally from one drum to the next to form a windrow on the side of the drum 3, which is the trailing drum. The lateral movement of the hay is promoted by drivers 20 provided on the walls of the drums 1, 2, and 3. At this point, the reader's attention is invited to French Pat. No. 2,524764, published on Oct. 14, 1983, which shows the details of such a drive mechanism.

The drums 1, 2, and 3 can also be used for gathering hay. They are then associated with apparatuses such as trailers, bailers, or forage harvesters and bring the hay to those apparatuses.

For tossing hay, it is preferable to equip the drums 1, 2, and 3 with more aggressive drivers which drive the hay gathered by the flexible segments 18 to the back side of the machine and again spread it over the entire width of the strip of worked land.

Figure 2:
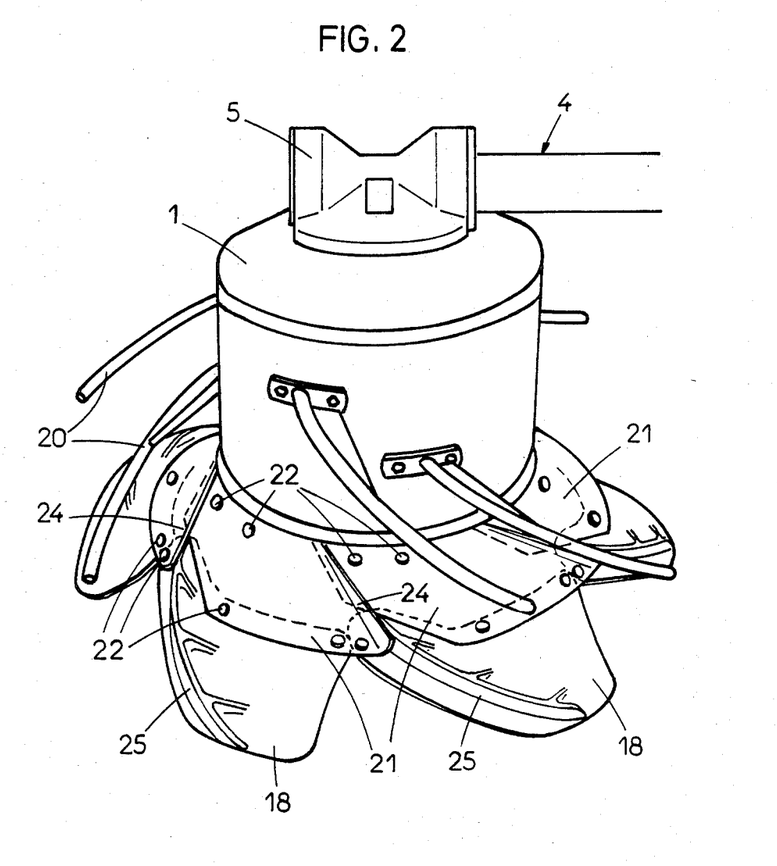
FIG. 2 shows, on a larger scale, a detail view of a first embodiment of a drum according to the invention.

According to an important characteristic of the invention, the ends of the flexible segments 18 which are connected to each tapered flange 17 are at least partly covered by panels 21. In the example of FIGS. 1 and 2, the panels 21 consist of pieces having approximately the shape of parallelograms. They can be made of steel sheet or plastic.

The panels 21 preferably extend to the associated one of the tapered flanges 17 or to the wall of the corresponding drum 1, 2, or 3 to assure a perfect protection of the ends of the flexible segments 18. As shown in FIGS. 4-6, the fastening of the panels 21 to the tapered flanges 17 and optionally to the bases of the drums 1, 2 and 3 is done by means of bolts 22 placed in two rows. The bolts 22 of the outside row, in addition, go through the flexible segments 18 and serve for fastening them to the tapered flanges 17. The flexible segments 18 are thus held fast between the tapered flanges 17 and the panels 21. The bolts 22 of the inside row further assure fastening of the tapered flanges 17 to the drums 1, 2, and 3.

As is seen clearly in FIG. 2, several overlapping panels 21 are provided on each drum 1, 2, and 3. In this example, there are as many panels 21 as there are flexible segments 18. However, this arrangement is not limiting. It is also possible to provide one panel 21 for fastening several flexible segments 18.

Figure 3:
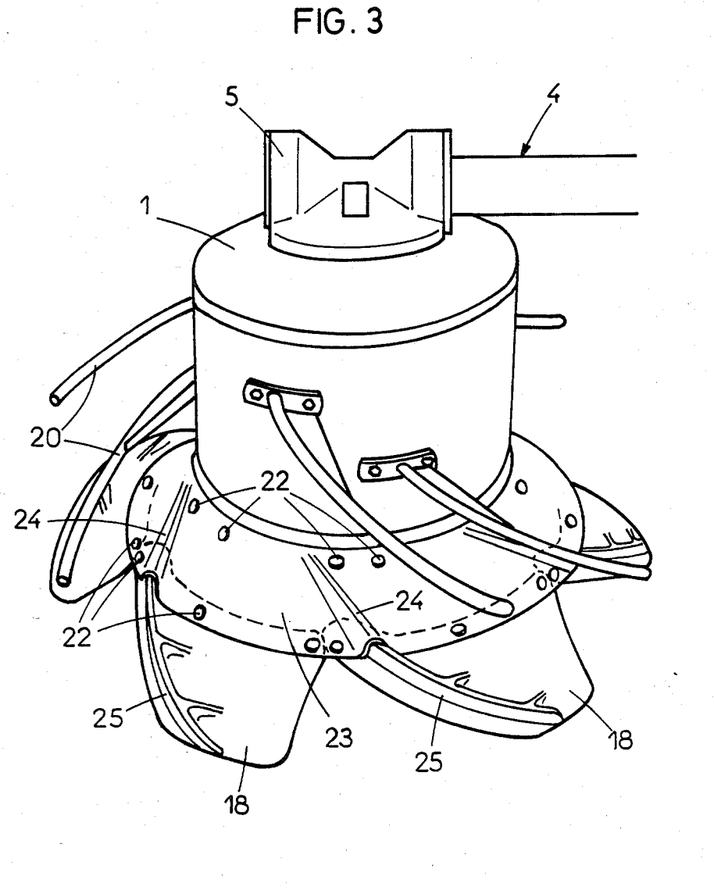
FIG. 3 shows a view similar to that of FIG. 2 of a second embodiment of a drum according to the invention.

In the example of FIG. 3, the panels 21 consist of a tapered crown 23. As in the other examples, each tapered crown 23 is fastened to the associated tapered flange 17 by the bolts 22. Thus, a single piece is used to improve the holding of all the flexible segments 18 on the same drum 1, 2, or 3.

The panels 21 or the tapered crown 23 are advantageously provided with driving ribs or blades 24. The ribs or blades 24 catch the hay lifted by the flexible segments 18 and aid in moving it laterally. The ribs or blades 24 advantageously extend in the extention of driving ribs 25 provided on the flexible segments 18. This promotes the passage of a part of the hay from the flexible segments 18 over the panels 21 during working.

In the examples shown in FIG. 2, the flexible segments 18 comprise driving ribs 25 which are extended in the direction of the walls of the drums 1, 2, and 3. The ribs or blades 24 on the panels 21 are placed against the front face—seen in the direction of rotation F of each drum 1, 2, and 3—of the driving ribs 25 of the flexible segments 18. Further, they extend approximately at the same height as the driving ribs 25 to facilitate disengagement of the hay in the zone where it must leave the drums 1, 2, and 3. The relative covering of the driving ribs 25 on the flexible segments 18 by ribs or blades 24 improves the connection between the flexible segments 18 and the tapered flange 17 of each drum 1, 2, and 3.

The same advantages are obtained with the embodiment shown in FIG. 3. In this example, the driving ribs 25 on the flexible segments 18 penetrate into their ribs or blades 24 on the tapered crown 23. Although shown connected to the tapered crown 23, this example can also be applied to the panels 21 of FIG. 2. The height of the ribs or blades 24 diminish as they come closer to the wall of the corresponding drum 1, 2, or 3. This does not harm the movement of the hay, since the amount of hay that reaches the wall of the drums is relatively slight. On the other hand, it advantageously reduces the air currents that they could create and which would have a tendency to drive the hay between the drums 1, 2, and 3.

According to another characteristic of the invention, which is shown in FIG. 4, each of the flexible segments 18 comprises at least one arc-shaped rib 26 concentric with the associated drum 1, 2, or 3. Each panel 21 comprises at least one groove 27 which has approximately the same shape as the associated arc-shaped rib 26. When the arc-shaped ribs 26 are installed, they fit into the grooves 27 to improve the connection of the flexible segments 18 to the panels 21.

In the examples shown in FIG. 5, each flexible segment 18 has at least one arc-shaped groove 28 concentric with the associated drum 1, 2, or 3. In this case, each panel 21 comprises a molding 29 of approximately the same shape, which engages the arc-shaped groove 28. This arrangement also makes it possible to improve the connection between the flexible segments 18 and the panels 21.

According to another characteristic of the invention, each flexible segment 18 is bent downwardly (see FIG. 6). The outside part of each flexible segment 18 forms an angle α of 160° with the part of the flexible segment 18 used for fastening the flexible segment 18 to the associated tapered flange 17. Flexible segments 18, thus preformed, during working adapt an ideal position for grabbing the hay under the effect of centrifugal force.

Figure 7:
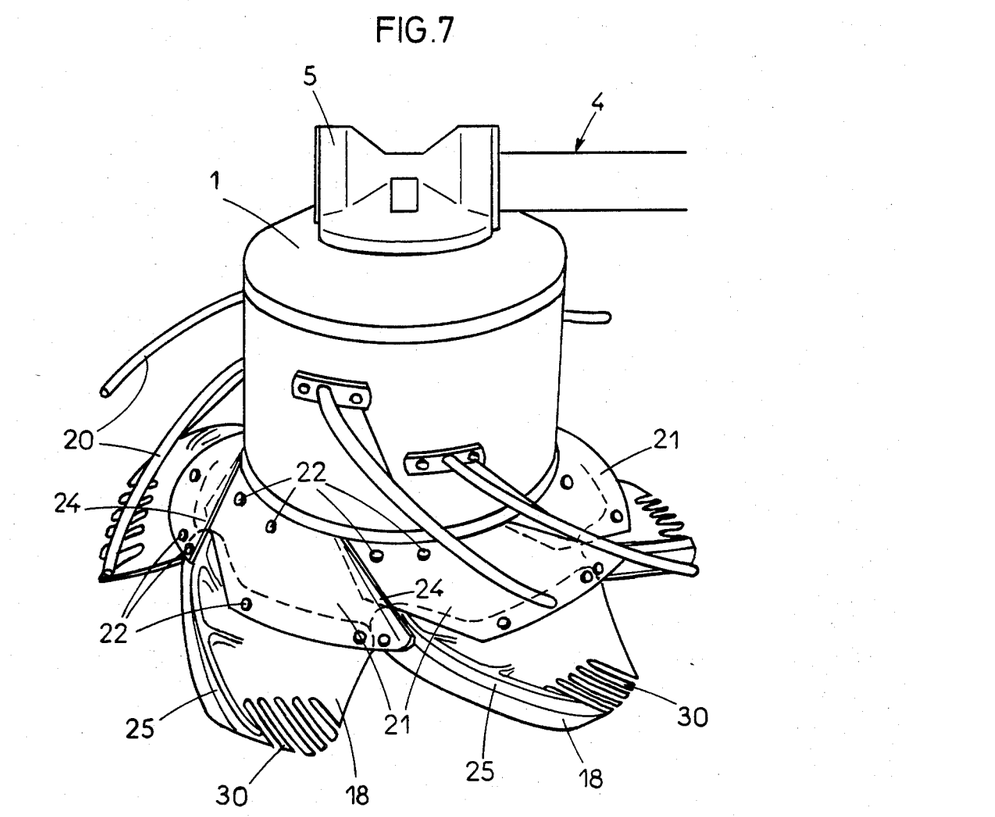
FIG. 7 shows a sixth embodiment of a drum according to the invention.

In the example shown in FIG. 7, the outside part of each flexible segment 18 is formed by strips 30. The strips 30 are directed outwardly and in the direction opposite to the direction of rotation F of the drums 1, 2, and 3. The outside parts consisting of the strips 30 are more gentle in regard to the gathered hay and the remaining vegetation.

It is advantageous to provide a reinforcement 31 under the tapered flange 17 of each drum 1, 2, and 3. As is clearly shown in FIGS. 4, 5 and 6, the reinforcement 31 consists of a ring 32 which is welded to the tapered flange 17. It thus reinforces the tapered flange 17 and keeps it from being deformed in case an obstacle is encountered. Furthermore, it is advantageous to place the reinforcement 31 so that its lower part is closer to the ground than the outside edge of the tapered edge 17. The tapered flange 17 is thus protected from encountering possible obstacles.

In FIG. 5, the ring 32 is located at the outside edge of the tapered flange 17. Thus, in case of strong pressure on the flexible segments 18, the flexible segments 18 are supported on a rounded surface. The rounded surface is not aggressive in regard to the flexible segments 18 and does not risk damaging them.

It is obvious that it will be possible to make various improvements, modifications, or additions to the embodiments described above or to replace certain elements with equivalent elements without thereby going outside the scope of this invention.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An agricultural machine comprising:
   (a) at least one at least generally vertically oriented drum, said at least one at least generally vertically oriented drum comprising an at least generally cylindrical, tubular wall;
   (b) means for rotating said at least one at least generally vertically oriented drum about a central at least generally vertical axis;
   (c) a tapered annular flange situated at the lower end of the wall of said at least one at least generally vertically oriented drum;
   (d) a plurality of flexible working segments attached to said tapered annular flange and extending downwardly and outwardly therefrom; and
   (e) at least one panel attached to said tapered annular flange and to said plurality of flexible working segments, said at least one panel covering at least partially the upper ends of said plurality of flexible working segments;
   (F) wherein said plurality of flexible working segments are held fast between said tapered annular flange and said at least one panel.

2. An agricultural machine according to claim 1 wherein said at least one panel extends to the vicinity of the wall of said drum.

3. An agricultural machine according to claim 1 wherein said at least one panel is bolted to said tapered annular flange.

4. An agricultural machine according to claim 1 wherein a plurality of overlapping panels are provided on said drum.

5. An agricultural machine according to claim 1 wherein said at least one panel comprises a tapered crown.

6. An agricultural machine according to claim 1 wherein said at least one panel is provided with a plurality of driving ribs or blades.

7. An agricultural machine according to claim 6 wherein:
   (a) each one of said plurality of flexible working segments has at least one driving rib and
   (b) said driving ribs or blades on said at least one panel extend in the extension of said driving ribs on said plurality of flexible working segments.

8. An agricultural machine according to claim 7 wherein:
   (a) each one of said plurality of flexible working segments has at least one driving rib which extends in the direction of said drum and
   (b) said driving ribs or blades on said at least one panel are placed against the front face—seen from the direction of rotation F—of said driving ribs on said plurality of flexible working segments and have approximately the same height as said driving ribs on said plurality of flexible working segments.

9. An agricultural machine according to claim 6 wherein the height of said driving ribs or blades on said at least one panel diminish as they come closer to said drum.

10. An agricultural machine according to claim 7 wherein said driving ribs on said plurality of flexible working segments are extended toward said drum and partially penetrate into said driving ribs or blades on said at least one panel.

11. An agricultural machine according to claim 1 wherein:
   (a) each of said plurality of flexible working segments comprises at least one arc-shaped rib concentric with said drum and (b) said at least one panel comprises at least one groove sized, shaped, and positioned to receive said at least one arc-shaped rib.

12. An agricultural machine according to claim 1 wherein:
   (a) each of said plurality of flexible working segments has at least one arc-shaped groove concentric with said drum and
   (b) said at least one panel has at least one ridge sized, shaped, and positioned to engage said at least one arc-shaped groove.

13. An agricultural machine according to claim 1 wherein each one of said plurality of flexible working segments is bent.

14. An agricultural machine according to claim 13 wherein the outside part of each one of said plurality of flexible working segments forms an angle α of about 160° C. with the part used for fastening the segment to said tapered annular flange.

15. An agricultural machine according to claim 1 wherein the outside part of each of said plurality of flexible working segments is formed by strips.

16. An agricultural machine according to claim 15 wherein said strips extend outwardly and in the direction opposite to the direction of rotation F.

17. An agricultural machine according to claim 1 wherein a reinforcement is provided under said tapered annular flange.

18. An agricultural machine according to claim 17 wherein the lower part of said reinforcement is closer to the ground than the outside edge of said tapered annular flange.

19. An agricultural machine according to claim 17 wherein said reinforcement comprises a ring.

20. An agricultural machine comprising:
   (a) at least one at least generally vertically oriented drum having a wall and being rotatable about a central at least generally upright axis;
   (b) a tapered annular flange situated at the lower end of the wall of said drum;
   (c) a plurality of flexible working segments attached to said tapered annular flange and extending downwardly and outwardly therefrom; and
   (d) at least one panel attached to said tapered annular flange and to said plurality of flexible working segments,
   (e) said plurality of flexible working segments being held fast between said tapered annular flange and said at least one panel.

21. An agricultural machine according to claim 20 wherein said at least one panel covers at least partially the upper ends of said plurality of flexible working segments.

22. An agricultural machine according to claim 20 wherein each one of said plurality of flexible working segments has at least one driving rib extending in the extension of driving ribs or blades on said at least one panel.

23. An agricultural machine according to claim 20 wherein each one of said plurality of flexible working segments has at least one driving rib placed against the rear face—seen from the direction of rotation F—of driving ribs or blades on said at least one panel and wherein said driving ribs of the flexible working segments have approximately the same height as said driving ribs or blades on said at least one panel.

24. An agricultural machine according to claim 20 wherein each one of said plurality of flexible working segments has at least one driving ribs or blades on said at least one panel.

* * * * *